(12) United States Patent
Wang et al.

(10) Patent No.: US 10,328,806 B2
(45) Date of Patent: Jun. 25, 2019

(54) AUTOMOBILE CHARGER

(71) Applicant: Pilot Inc., City of Industry, CA (US)

(72) Inventors: Calvin Shiening Wang, City of Industry, CA (US); Chung-Hsin Wang, Shenzhen (CN)

(73) Assignee: Pilot Inc., City of Industry, CA (US)

(*) Notice: Subject to any disclaimer, the term of this patent is extended or adjusted under 35 U.S.C. 154(b) by 0 days.

(21) Appl. No.: 15/923,219

(22) Filed: Mar. 16, 2018

(65) Prior Publication Data

US 2018/0201141 A1    Jul. 19, 2018

Related U.S. Application Data

(63) Continuation of application No. 15/355,409, filed on Nov. 18, 2016, now Pat. No. 10,046,653, which is a
(Continued)

(30) Foreign Application Priority Data

Apr. 28, 2014   (CN) ..................... 2014 2 0212173 U

(51) Int. Cl.
*B60L 11/18* (2006.01)
*H02J 7/00* (2006.01)
(Continued)

(52) U.S. Cl.
CPC .......... *B60L 11/1809* (2013.01); *B60L 53/00* (2019.02); *H02J 7/0034* (2013.01); *H02J 7/0065* (2013.01);
(Continued)

(58) Field of Classification Search
CPC ..... B60L 11/1809; H02J 7/0065; H02J 9/005; H02J 7/0068; H02J 7/0029; H02J 7/0034
(Continued)

(56) References Cited

U.S. PATENT DOCUMENTS 3,343,057 A   9/1967  Smith
3,590,357 A   6/1971  Reid
(Continued)

FOREIGN PATENT DOCUMENTS

CN   201947042   8/2011
CN   203522157   4/2014

OTHER PUBLICATIONS

Official Action for U.S. Appl. No. 15/355,409, dated May 3, 2018 6 pages.
(Continued)

*Primary Examiner* — Sun J Lin
(74) *Attorney, Agent, or Firm* — Sheridan Ross P.C.

(57) ABSTRACT

A novel automobile charger comprises a direct current (DC) voltage supply, wherein a positive pole of the (DC) voltage supply is connected with a first end or a first lead of a DC-to-DC module, a first end of a battery voltage detection module and a first end of a load module simultaneously while a negative pole of the DC voltage supply is connected with a second end of the DC-to-DC module, a first end of a microcontroller, a first end of an automobile start control module and a second end of the battery voltage detection module simultaneously. A third end of the DC-to-DC module is connected with a second end of the microcontroller. Third, fourth, and fifth ends of the microcontroller are connected with a third end of the battery voltage detection module, a second end of the automobile start control module and a first end of a load detection module respectively. A second end of the load detection module is connected with a third end of the automobile start control module and a second end of the load module simultaneously.

20 Claims, 2 Drawing Sheets

Related U.S. Application Data continuation of application No. 14/569,352, filed on Dec. 12, 2014, now Pat. No. 9,525,297.

(51) Int. Cl.
    *H02J 9/00*           (2006.01)
    *B60L 53/00*       (2019.01)

(52) U.S. Cl.
    CPC ........... *H02J 7/0068* (2013.01); *H02J 7/0029* (2013.01); *H02J 9/005* (2013.01)

(58) Field of Classification Search
    USPC ........................................................ 320/109
    See application file for complete search history.

(56) References Cited

U.S. PATENT DOCUMENTS

| | | | |
|---|---|---|---|
| 3,950,668 | A | 4/1976 | Sancey et al. |
| 5,487,002 | A | 1/1996 | Diller et al. |
| 5,793,185 | A | 8/1998 | Prelec |
| 6,130,519 | A | 10/2000 | Whiting et al. |
| 6,262,492 | B1 | 7/2001 | Sheng |
| 6,351,102 | B1 | 2/2002 | Troy |
| 6,803,743 | B2 | 10/2004 | George et al. |
| 7,199,555 | B2 | 4/2007 | Hung |
| 7,345,450 | B2 | 3/2008 | Krieger et al. |
| 8,183,821 | B2 | 5/2012 | Sakurai |
| 8,253,376 | B2 | 8/2012 | Gale et al. |
| 8,447,543 | B2 | 5/2013 | Dickinson et al. |
| 8,565,930 | B2 | 10/2013 | Miwa |
| 8,692,513 | B2 | 4/2014 | Gaul et al. |
| 8,723,477 | B2 | 5/2014 | Gaul et al. |
| 9,007,015 | B1 | 4/2015 | Nook et al. |
| 9,248,746 | B2 | 2/2016 | Wen |
| 9,263,907 | B2 | 2/2016 | Richardson et al. |
| 9,333,865 | B2 | 5/2016 | Kawasaki et al. |
| 9,352,652 | B2 | 5/2016 | Cavazos et al. |
| 9,412,994 | B2 | 8/2016 | Koebler |
| 9,496,728 | B2 | 11/2016 | Lei |
| 9,506,446 | B2 | 11/2016 | Xinfang |
| 9,525,297 | B2 * | 12/2016 | Wang .................. B60L 11/1809 |
| 10,046,653 | B2 * | 8/2018 | Wang et al. ......... B60L 11/1809 |
| 2005/0110467 | A1 | 5/2005 | Thomason |
| 2009/0008374 | A1 | 1/2009 | Fosbinder |
| 2009/0174362 | A1 | 7/2009 | Richardson et al. |
| 2012/0025763 | A1 | 2/2012 | Hsiao et al. |
| 2013/0015814 | A1 | 1/2013 | Kelty et al. |
| 2015/0032312 | A1 | 1/2015 | Lambrinos et al. |
| 2015/0212135 | A1 | 7/2015 | Jin et al. |
| 2017/0066338 | A1 | 3/2017 | Wang |

OTHER PUBLICATIONS

Notice of Allowance for U.S. Appl. No. 15/355,409, dated Jun. 21, 2018 7 pages.
"3000A 12/24V High Cranking Sure Start Jumpstarter," Projecta, Oct. 2011, 12 pages.
"900 Peak Amp Jump-Starter Model No. PKC0AZ Owner's Manual and Warranty Information," Old World Industries, LLC, © 2014, 8 pages.
"HT75XX-1 100mA Low Power LDO," Holtek Semiconductor Inc., Jan. 12, 2006, Rev. 1.50, 14 pages.
"LM78XX/LM78XXA 3-Terminal 1A Positive Voltage Regulator," Fairchild Semiconductor Corporation, Mar. 2008, Rev. 1.0, 28 pages.
"Start-It Jump Starter 12 Volt DC Power Supply User's Manual & Warranty Information," Vector Manufacturing, © 2005, 6 pages.
Official Action for U.S. Appl. No. 14/569,352, dated Aug. 31, 2016, 8 pages.
Notice of Allowance for U.S. Appl. No. 14/569,352, dated Oct. 13, 2016, 7 pages.
Official Action for U.S. Appl. No. 15/355,409, dated Dec. 14, 2017 6 pages.
Petition for Inter Partes Review of U.S. Pat. No. 9,525,297, filed Jan. 13, 2018 93 pages.
Decision Institution of Inter Partes Review for U.S. Pat. No. 9,525,297, dated Jul. 16, 2018, 22 pages.
Order Granting Joint Motion to Terminate Proceeding and Granting Joint Request to Treat Settlement Agreement as Business Confidential Information for U.S. Pat. No. 9,525,297, dated Nov. 16, 2018, 4 pages.
Declaration of Shukri Souri in Support of Petition for Inter Partes Review of U.S. Pat. No. 9,525,297, dated Jan. 13, 2018, 92 pages.
Curriculm Vitae of Dr. Shukri J. Souri, Jul. 2016, 4 pages.

* cited by examiner

AUTOMOBILE CHARGER

RELATED APPLICATIONS

This application is a continuation of U.S. Pat. No. 15/355,409, filed on Nov. 18, 2016 and entitled "Automobile Charger," now U.S. Pat. No. 10,046,653, which is a continuation of U.S. patent application Ser. No. 14/569,352, filed on Dec. 12, 2014 and entitled "Automobile Charger," now U.S. Pat. No. 9,525,297, which claims the benefit of priority of Chinese application no. 201420212173.5 filed Apr. 28, 2014, the entire content of which is incorporated herein by reference.

BACKGROUND

The present disclosure relates to an automobile charging device, in particular relates to a novel automobile charger with a safe power supply charging quickly.

Automobile charging is a big issue of traveling by automobile for those automobile fans and businessmen, the maturity of the technology thereof is one of the critical factors restricting the application of the automobile charger. However, current automobile chargers have common problems of not able to automatically detect whether a load is connected, whether an electrode is connected with an automobile storage battery reversely, whether an automobile engine or the storage battery has a reverse current, whether the battery state is suitable for heavy current power generation and so on. Accordingly, the present disclosure provides a novel automobile charger with the safe power supply charging quickly to solve the problems mentioned above, thus making the automobile charging safe, quick, mature and propagable.

SUMMARY

A purpose of the present disclosure aims to provide a novel automobile charger with the safe power supply charging quickly, in order to solve the problems presented in the above background.

To achieve the purpose described above, the present disclosure provides the following technical solutions: a novel automobile charger comprises a direct current power supply, wherein a positive pole of the direct current power supply is connected with one end of a DC to DC module, one end of a battery voltage detection module and one end of a load module simultaneously, while a negative pole of the direct current voltage is connected with the other end of the DC to DC module, one end of a microcontroller, one end of an automobile start control module and the other end of the battery voltage detection module simultaneously. A third end of the DC to DC module is connected with the other end of the microcontroller, and the other three ends of the microcontroller are connected with the third end of the battery voltage detection module, the other end of the automobile start control module and one end of the load detection module respectively, wherein the other end of the load detection module is connected with the third end of the automobile start control module and the other end of the load module simultaneously; the load module which comprises the automobile storage battery and the automobile engine is located on the end of the load module.

As a further solution of the present disclosure that: the DC to DC module provides a stable voltage for the microcontroller which collects relevant data to conduct the corresponding control. The battery voltage detection module conducts the measurement of the batter voltage, the automobile start control module conducts the power supply or the power outage for the load module through the microcontroller, and the load detection module which comprises the automobile storage battery or the automobile engine detects whether the load module is correctly connected.

As a further solution of the present disclosure that: the circuit employs an electronic switch to supply power to the load module, which can offer more protection for the product, or reduce the product size and the material cost.

As a further solution of the present disclosure that: the battery voltage detection module provides protection for the power supply battery to prevent damages caused by the discharging of the direct current power supply.

As a further solution of the present disclosure that: the load detection module prevents improper operations of the user.

As a further solution of the present disclosure that: in the standby mode, the microcontroller closes all outputs when the voltage of the direct current power supply is lower than that of the state being able to supply power and then recovers when it is higher than that of the state being able to supply power.

As a further solution of the present disclosure that: the automobile start control module is the electronic switch.

Compared to the prior art, the present disclosure has the beneficial effects that:

1. The present disclosure employs the electronic switch to control the supply power for the load, this part can offer more protection for the product, and reduce the product size and the material cost.

2. The battery detection of the present disclosure can provide low voltage protection to prevent damages caused by the over discharging of the battery.

3. The load detection of the present disclosure can prevent improper operations by the user, such as reversed polarity, which causes damages to the automobile or the direct current power supply.

4. The present disclosure employs the voltage backflow protection for abnormal load, wherein the automobile start line is closed to protect the battery when the abnormal voltage is detected.

5. The present disclosure has a last charging function, and can be installed fixedly or moved portably according to the use requirements of people.

6. The automatic detection module of the present disclosure can automatically detects whether the load is connected, whether the electrode is connected with the automobile storage battery reversely, whether the automobile engine or the storage battery has reverse current, whether the battery state is suitable for heavy current power generation, thereby protecting the load and the circuit and thus has complete functions.

In figures: 1—DC to DC module, 2—microcontroller, 3—battery voltage detection module, 4—automobile start control module, 5—load detection module, 6—load module, 7—direct current power supply.

DETAILED EMBODIMENTS

The technical solutions of the present disclosure will be described more clearly and fully in conjunction with drawings in the embodiments of the present disclosure, and obviously, the described embodiments are merely a part of the embodiments of the present disclosure, not all the embodiments. Based on the embodiments of the present disclosure, all the other embodiments obtained by the ordinary skilled in the art without creative labors belong to the scope claimed by the present disclosure.

Figure 1:
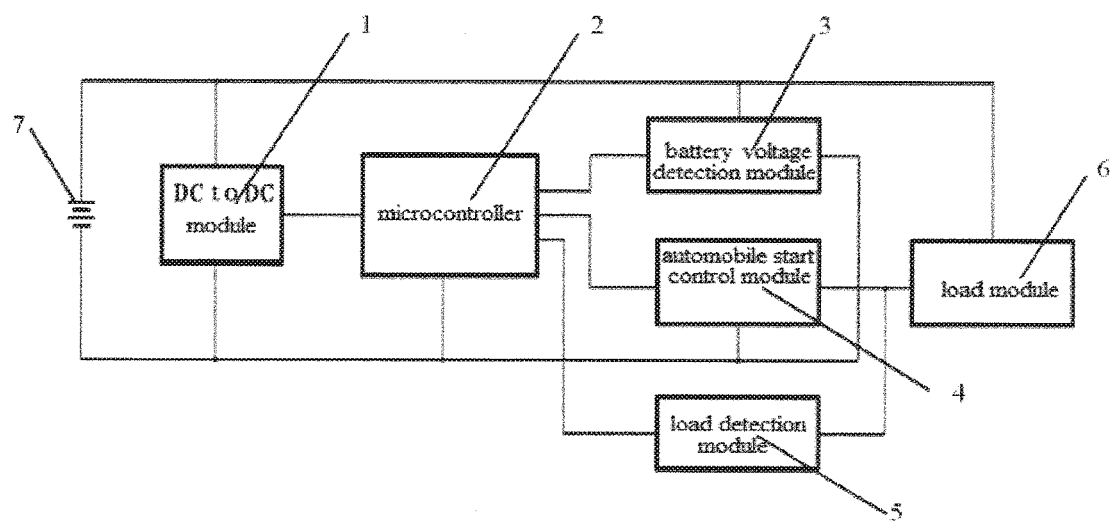
FIG. 1 is a block diagram for the principle of the emergency power supply of the safe intelligent automobile.

Refer to FIG. 1, a novel automobile charger comprises a direct current power supply, wherein the positive pole of the direct current power supply is connected with one end or lead of the DC to DC module, one end of the battery voltage detection module and one end of the load module simultaneously, while the negative pole of the direct current voltage is connected with the other end of the DC to DC module, one end of the microcontroller, one end of the automobile start control module and the other end of the battery voltage detection module simultaneously. A third end of the DC to DC module is connected with the other end of the microcontroller, and the other three ends of the microcontroller are connected with the third end of the battery voltage detection module, the other end of the automobile start control module and one end of the load detection module respectively, wherein the other end of the load detection module is connected with the third end of the automobile start control module and the other end of the load module simultaneously; the load module which comprises the automobile storage battery and the automobile engine is located on the end of the load module.

Figure 2:
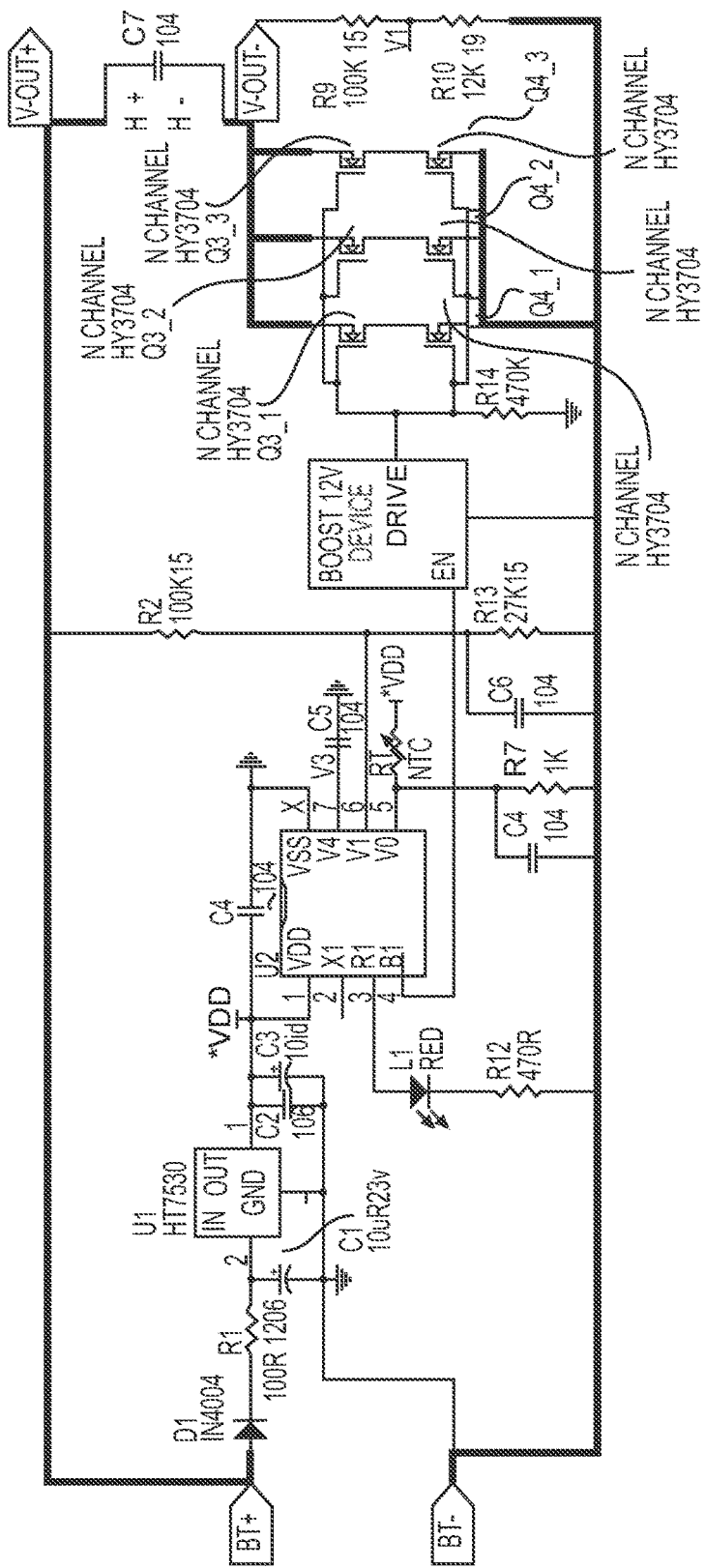
FIG. 2 is a circuit diagram for the emergency power supply of the safe intelligent automobile.

Refer to FIG. 2, the DC to DC module comprises a diode D1, a resistor R1, capacitor C1, a HT7530 voltage stabilizing tube, capacitors C2 and C3, wherein the positive pole of the diode D1 is connected with the positive pole of the battery, the negative pole of the diode D1 is connected with one end of the capacitor C1 and an IN port of the HT7530 voltage stabilizing tube simultaneously through the resistor R1, and an OUT port of the HT7530 voltage stabilizing tube is connected with one end of the capacitor C2, one end of the capacitor C3 and a VDD port of the microcontroller U2, while the other end of the capacitor C1, the other end of the capacitor C2 and the other end of the capacitor C3 as well as a GND port of the HT7530 voltage stabilizing tube are grounded and connected with the negative pole of the battery simultaneously; a R1 port of the microcontroller U2 is connected with the negative pole of the battery through a light-emitting diode L1 and a resistor R12 which are in series connection, a B1 port of the microcontroller U2 is connected with a EN port of the automobile start control module, a V0 port of the microcontroller U2 is connected with the negative pole of the battery through a capacitor C4 and a resistor R7 which are in parallel connection, the V0 port is also connected with the VDD port through a slide rheostat RT, a V1 port of the microcontroller U2 is also connected with the negative pole of the battery through a resistor 10, a capacitor C6 and a resistor R13 which are in parallel connection, the V1 port is connected with the positive pole of the battery through a resistor R2, and is also connected with the negative pole of the automobile storage battery and the automobile engine simultaneously through a resistor R9, wherein two ends of the automobile storage battery are in parallel connection with the capacitor C7, resistors R9, 10, a capacitor C6 and a resistor R13 to form the load detection module together, a V4 port of the microcontroller U2 is grounded through a capacitor C5, a VSS port of the microcontroller U2 and one end of the capacitor C4 are grounded simultaneously. The other end of the capacitor C4 is connected with the VDD port of the microcontroller U2, the resistors R2, R13 and capacitor C6 form the battery voltage detection module together, and a Drive port of the automobile start control module is connected with the automobile engine and one end of a resistor R14 simultaneously, wherein the other end of the resistor R14 is grounded.

The EN port of the automobile start control module is positioned on a boost device, which provides a gate-source voltage to a plurality of N-channel MOSFETs Q3_1, Q3_2, Q3_3, Q4_1, Q4_2, Q4_3, which are connected in parallel pairs.

The DC to DC module in the present disclosure provides the stable voltage for the microcontroller which collects relevant data to conduct the corresponding control. The battery voltage detection module conducts the measurement of the batter voltage, and the automobile start control module conducts the power supply or the power outage for the load module through the microcontroller, wherein the load detection module detects whether the load module is correctly connected.

The microcontroller in the present disclosure determines whether the automobile storage battery is connected with the automobile engine through the load detection module, wherein the automobile start control model is automatically activated and the battery starts to supply power to the load module when the load is correctly connected; the automobile start control model is automatically deactivated and the battery stops supplying power to the load module when assuming that the load is not connected or the positive and negative polarities are reversely connected. In the standby mode, the microcontroller closes all outputs when the battery voltage is lower than 9V, and recovers the normal operation only when the battery voltage is larger than 10V; the automobile engine will generate the normal voltage to recharge the battery after the automobile starts, whereas the automobile start control module is deactivated immediately once the recharging voltage is larger than the voltage before that battery starts the power supply, to protect the battery from damages caused by charging with the normal voltage; the automobile start control module is the electronic switch, which can prevent the load from being reversely connected and recharging of the normal voltage, thus protecting the battery and prolonging lifespan.

The automobile engine will generate abnormal voltage to recharge the direct current power supply after the automobile starts, and the automobile start control module is deactivated immediately once the recharging voltage is larger than the voltage before the direct current power supply starts the power supply, to protect the direct current power supply from damages caused by charging with normal voltage charge.

It is obvious for the skilled people in the art that the present disclosure is not merely limited to the details of the above exemplary embodiments, and the present disclosure can be implemented in other specific forms without departing from the sprits or the basic features of the present disclosure. Thus, no matter to consider from which point of view, the embodiments should be considered as exemplary and non-limiting. The scope of the present disclosure is defined by the accompanying Claims rather than the above description, therefore it is intended that all the changes fallen within the meanings and scope of the equivalent elements of the Claims are contained in the present disclosure. Any drawing reference in the Claims should not be regarded as limiting the Claims involved.

Furthermore, it should be understood that although the specification is described according to the embodiments, but not every embodiment includes only an independent technical solution, this manner of description for the specification is only for clarity, therefore the skilled people in the art should take the Specification as a whole, and the technical solutions in various embodiments can be combined appropriately to form other implementations understandable for those skilled in the art.

What is claimed is:

1. A charging device, comprising:
   a battery connected to a voltage regulator, the battery supplying a charging current;
   a battery voltage detector, connected to a microcontroller, to detect a voltage of an automobile battery when the charging device is connected to an automobile;
   a load detector, connected to the microcontroller, to detect when the charging device is connected to the automobile battery;
   the microcontroller generating, when the charging device is connected to the automobile battery, an output signal based on a detected voltage of the automotive battery;
   switching circuitry including a plurality of MOSFETs to selectively connect a negative terminal of the battery to the automobile battery when the microcontroller generates the output signal; and
   a boost device for boosting a gate voltage of the plurality of MOSFETs.

2. The charging device of claim 1, wherein the voltage regulator comprises a voltage stabilizer connected to a resistor, a capacitor and the microcontroller, the voltage regulator providing a DC power to the microcontroller.

3. The charging device of claim 1, wherein the load detector comprises a resistor in parallel with a capacitor, the resistor and the capacitor connected to the microcontroller.

4. The charging device of claim 1, wherein the microcontroller comprises a plurality of ports, the plurality of ports including a power supply port, a ground port, an output signal port, and an automobile start control module.

5. The charging device of claim 1, wherein the switching circuitry is connected to the microcontroller via the boost device, and the plurality of MOSFETs are connected in parallel.

6. The charging device of claim 1, wherein the microcontroller:
   generates the output signal to cause the switching circuitry to connect the battery to the automobile battery when the automobile battery is properly connected and a voltage level of the battery is above a threshold; and
   generates the output signal to cause the switching circuitry to disconnect the battery from the automobile battery when i) the voltage level of the battery is below the threshold, or ii) the automobile battery is improperly connected.

7. The charging device of claim 1, wherein the battery voltage detector detects a recharging voltage level of the battery.

8. The charging device of claim 7, wherein the microcontroller generates the output signal to cause the switching circuitry to disconnect the battery from the automobile battery when the recharging voltage level of the battery is greater than a threshold.

9. The charging device of claim 1, wherein the voltage regulator is a direct-current to direct-current (DC-DC) converter.

10. The charging device of claim 1, wherein the load detector prevents improper user operation of the charging device.

11. The charging device of claim 1, wherein the load detector detects a reversed polarity condition.

12. The charging device of claim 1, wherein the load detector is connected to a negative terminal of the plurality of MOSFETs.

13. The charging device of claim 1, further comprising one or more light emitting diodes (LEDs) controlled by the microcontroller.

14. The charging device of claim 1, wherein a portion of the load detector is connected in parallel with the plurality of MOSFETs.

15. The charging device of claim 1, wherein the microcontroller causes the charging device to enter a standby mode when a voltage of the battery is less than 9V and allows operation when the voltage of the battery is greater than 10V.

16. A method for a device to charge an automobile battery, the method comprising:
   detecting a voltage level of a battery;
   detecting a connection and a type of connection between the battery and the automobile battery;
   generating, by a microcontroller, an output signal based on the voltage level of the battery, the connection to the automobile battery and the type of connection of the automobile battery;
   selectively connecting the battery to the automobile battery using the output signal; and
   providing a low voltage protection to prevent damages caused by over discharging of the battery.

17. The method of claim 16, further comprising activating a plurality of MOSFETs to connect the battery and the automobile battery, wherein a boost device boosts a gate voltage of the plurality of MOSFETs.

18. The method of claim 17, wherein:
   a proper type of connection of the automobile battery is a correct polarity, and
   an improper type of connection of the automobile battery is an incorrect polarity.

19. The method of claim 17, wherein the generating comprises:
   generating the output signal to cause switching circuitry to connect the battery to the automobile battery when the automobile battery is properly connected and a voltage level of the battery is above a threshold; and
   generating the output signal to cause the switching circuitry to disconnect the battery from the automobile battery when i) the voltage level of the battery is below the threshold, or ii) the automobile battery is improperly connected.

20. A system for charging an automobile battery, the system comprising:
   means for detecting a voltage level of a battery;
   means for detecting a type of connection between the battery and the automobile battery;
   means for generating, by a microcontroller, an output signal based on the voltage level of the battery and the type of connection of the automobile battery; and
   means for selectively connecting the battery to the automobile battery based on the output signal; and
   a boost device for boosting a voltage associated with the means for selectively connecting the battery to the automobile battery based on the output signal.

* * * * *

(12) INTER PARTES REVIEW CERTIFICATE (3106th)

United States Patent
Wang et al.

(10) Number: US 10,328,806 K1
(45) Certificate Issued: Apr. 28, 2023

(54) AUTOMOBILE CHARGER

(71) Applicants: Calvin Shiening Wang; Chung-Hsin Wang

(72) Inventors: Calvin Shiening Wang; Chung-Hsin Wang

(73) Assignee: PILOT INC.

Trial Number:

IPR2021-01235 filed Jul. 7, 2021

Inter Partes Review Certificate for:

Patent No.: 10,328,806
Issued: Jun. 25, 2019
Appl. No.: 15/923,219
Filed: Mar. 16, 2018

The results of IPR2021-01235 are reflected in this inter partes review certificate under 35 U.S.C. 318(b).

INTER PARTES REVIEW CERTIFICATE
U.S. Patent 10,328,806 K1
Trial No. IPR2021-01235
Certificate Issued Apr. 28, 2023

AS A RESULT OF THE INTER PARTES REVIEW PROCEEDING, IT HAS BEEN DETERMINED THAT:

Claims 1-19 are cancelled.

\* \* \* \* \*